Sept. 30, 1958 W. F. POORE 2,854,029
DAMPENER FOR PIPE LINES
Filed July 30, 1956
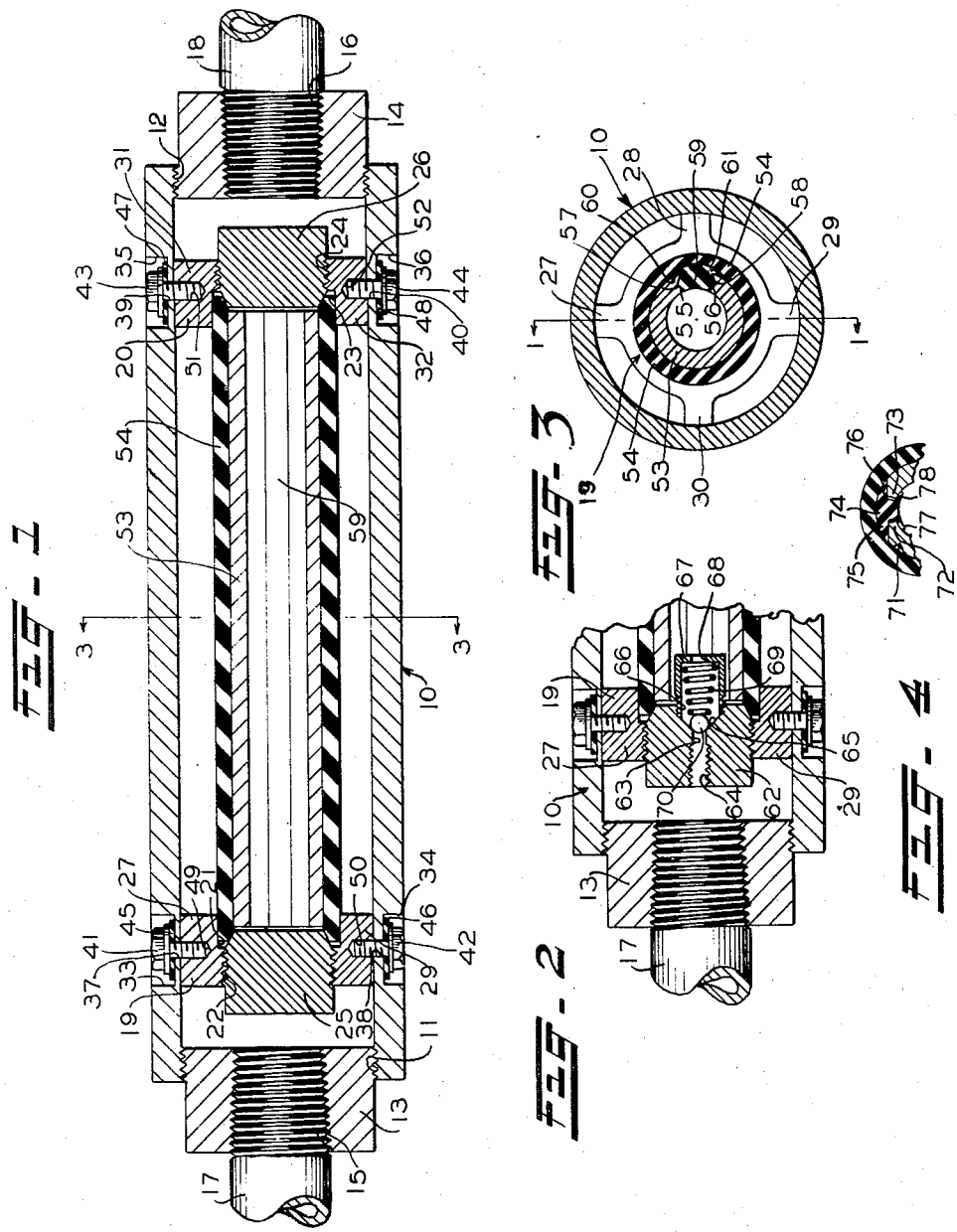
INVENTOR.
Wallace F. Poore
BY
Adelbert A. Steinmiller
ATTORNEY

2,854,029

Patented Sept. 30, 1958

2,854,029

DAMPENER FOR PIPE LINES

Wallace F. Poore, East McKeesport, Pa., assignor to Westinghouse Air Brake Company, Wilmerding, Pa., a corporation of Pennsylvania Application July 30, 1956, Serial No. 600,780

3 Claims. (Cl. 138—30)

This invention relates to devices for dampening, absorbing, or suppressing undesired pressure pulsations or surges in fluid systems, and more particularly to devices of the type employing a mandrel and resilient means associated therewith for providing a volume which varies as a result of pressure variations, and which is adapted to be connected in circuit with conduits or pipe lines carrying fluid subject to such pulsations or surges.

As is well known in the art to which the invention relates, pulsations and surges which the apparatus of the instant invention is designed to dampen and suppress originate in fluid systems in a number of ways. Reciprocating pumps have an output which is usually characterized by low frequency surges of high volume or intensity; centrifugal and rotary pumps may have in their fluid output low volume surges occurrying at a higher frequency. In addition to these periodic surges, shock waves may be generated in any fluid flow system where the fluid is subject to sudden deceleration, such for example as that caused by closing a valve against the moving column of fluid. The closing of such a valve may result in the generation of surges or shock waves of high intensity, which may result in damaged pipe lines and in undesirable noises frequently known as "water hammer."

It is old in the art to suppress and dampen these surges and shock waves by connecting in the fluid line a resilient sleeve of rubber or other suitable resilient material, the resilient sleeve usually being supported by a mandrel and providing a variable volume. Sudden increases of pressure in the fluid in the line cause the fluid to flow into the volume between the sleeve and the mandrel, expanding the sleeve and thereby taking up or absorbing the excess pressure. When the pressure in the line returns to normal, the sleeve contracts and the fluid between the sleeve and the mandrel is discharged back into the line. The mandrel is usually perforated and contact between the sleeve and the perforations results in damage to the sleeve. Frequently, the resilient sleeve is enclosed by a chamber of compressed air, to assist the sleeve in opposing expansion, and to further assist the resilient sleeve in rapid discharge of fluid back into the line after the surge of pressure has passed.

The apparatus of the instant invention obviates the necessity for a sealed chamber of compressed air enclosing the resilient sleeve, by providing a resilient mandrel for mounting the sleeve, the spring tension of the mandrel itself forcing the sleeve back to its former position after the surge of pressure has passed and taking up the excess volume. On the other hand, where it is desired to employ other fliud under pressure to assist in restoring the sleeve to its normal position, which may be desirable in high-pressure fluid systems, the apparatus of the instant invention provides for the introduction of fluid under pressure into the resilient mandrel itself.

The apparatus of the instant invention further eliminates the necessity for a perforated mandrel.

Accordingly, it is a primary object of the invention to provide a new and improved surge dampener for pipe lines.

Another object is to provide a new and improved surge dampener having a resilient, unperforated mandrel.

A further object is to provide new and improved surge dampener apparatus suitable for use with either low pressure or high pressure fluid systems.

Still a further object is to provide new and improved surge dampener apparatus of the type employing a resilient sleeve in which the fluid from which surges of pressure are to be removed flows around the outside of the sleeve.

Other objects and advantages will become apparent after a perusal of the following specification when studied in connection with the accompanying drawings, in which:

Fig. 1 is a longitudinal section through the preferred embodiment of the invention;

Fig. 2 is a fragmentary view of a second embodiment of the invention for use in high pressure fluid systems, showing all of the details in which the second embodiment differs from the preferred embodiment;

Fig. 3 is a cross-sectional view through the dampener apparatus of Fig. 1 taken in a plane substantially perpendicular to the plane of Fig. 1 along the line 3—3 thereof; and Fig. 4 is a fragmentary view of a modified form of mandrel and closing member.

Particular reference should be made now to the specification, for a fuller understanding of the invention, and to the drawings, in which like reference numerals are used throughout to designate like parts.

In Fig. 1, to which particular attention is now directed, there is shown a casing, comprising a pipe section, generally designated by the numeral 10 and having internally threaded ends 11 and 12. Mounted in the threaded ends 11 and 12 are a pair of plug members 13 and 14 respectively having threaded bores 15 and 16 therein respectively in which there are disposed in threaded engagement therein pipes or conduits 17 and 18 respectively, the pipes 17 and 18 carrying the fluid from which surges are to be removed.

Whereas for convenience of illustration only the embodiment of the invention has been shown in which fluid from which surges and pulsations of pressure are to be removed flows through the apparatus, the invention is not to be limited to such an arrangement. One end of the apparatus of Fig. 1 might be closed as by a plug, not shown, screw-threaded into bore 16, and the pipe 17 at the other end of the apparatus connected to the fluid line, as by a T-joint.

Disposed within the pipe section 10 near the ends thereof respectively are a pair of spider members 19 and 20. Spider member 19 has a counterbore 21 on one side thereof and a threaded bore 22 on the other side thereof. Spider member 20 has a counterbore 23 on the inside thereof, that is, the side facing toward the middle of the dampener apparatus, and a threaded bore 24 on the other side thereof, said threaded bores 22 and 24 having plugs 25 and 26 in screw-threaded engagement therein.

Each of the aforementioned spiders 19 and 20 has a number of arms, spider member 19 being shown in a side elevation in Fig. 3 and having four arms 27, 28, 29, and 30. Spider member 20 preferably has an equal number of arms, two of the arms being shown in Fig. 1 and designated 31 and 32. Whereas the invention has been shown and described with reference to spiders having four arms, the invention is not to be limited any particular number of arms. Disposed in the pipe section 10 adjacent the spider 19 are four peripherally-spaced indentations or wells, two of the wells being shown as 33 and 34, for receiving cap screws for holding the spider in place inside the pipe section. In a like manner in the pipe section 10 adjacent the spider 20 there are four peripherally-spaced indentations or wells for receiving the heads of cap screws for holding the arms of the spider 20 in place, two of the indentations being shown at 35 and 36 for arms 31 and 32 respectively. In the pipe section 10 radially inward of the aforementioned indentations, there are smaller bores for receiving the shanks of the cap screws; indentations 33, 34, 35, and 36 having bores 37, 38, 39 and 40 respectively through which pass the threaded ends of cap screws 41, 42, 43, and 44 respectively having gaskets 45, 46, 47 and 48 respectively, the aforementioned cap screws being in threaded engagement in threaded bores 49, 50, 51 and 52 respectively in the aforementioned spider arms 27, 29, 31 and 32 respectively.

Mounted between the plugs 25 and 26 is a mandrel designated by the reference numeral 53, the mandrel 53 having disposed therearound a sleeve 54 composed of rubber or other suitable resilient material. Preferably the mandrel 53 is made from spring steel, and is in the form of a cylinder with a break or slot running the entire length of the cylinder wall, the edges 55 and 56 having grooves 57 and 58 therein, respectively (Fig. 3), in which is disposed the resilient plug or closing member 59, which has flap portions or skirts 60 and 61 on either side thereof, the skirts normally resting against the outer wall of the mandrel.

It should be noted that the plugs 25 and 26 have tapered portions on the insides thereof for receiving the ends of the resilient sleeve 54. The plugs 25 and 26 are screwed into the associated spiders 19 and 20 respectively, and thereby force the adjacent ends of the resilient sleeve 54 against the walls of the counterbores to provide seals and prevent the escape of conduit fluid around the ends of the sleeve into the interior of the mandrel 53.

In assembling the above-described device, any convenient process may be employed, for example; the mandrel, resilient sleeve, spiders, and plug members 25 and 26 may be first assembled, and the assembled units slid or placed within the aforementioned section of pipe 10 and secured therein by the plurality of cap screws hereinbefore described.

Preferably, the sleeve is placed over the mandrel in a stretched or expanded condition, so that when the supporting mandrel contracts in diameter during use, in a manner hereinafter to be made more clearly apparent, the resilient sleeve is not forced by fluid pressure to assume a state smaller than its normal, free position would be. In other words, the mandrel is preferably held in a state of radial compression while the sleeve is mounted thereon, so that upon relaxation of such compressing force, the radial expansion of the mandrel will stretch the sleeve.

In the operation of the apparatus while the dampener is connected in a fluid line in which surges and pulsations of fluid pressure occur, sudden increases in pressure in the fluid flowing through the pipe section 10 around the outside of the sleeve 54 force the mandrel 53 to contract, causing the edges 55 and 56 to move closer to each other so that they compress closing element 59. After the surge of pressure has passed, the spring tension within the mandrel forces the mandrel and sleeve back to their former positions as shown in Fig. 1.

Sometimes surges in pressure are followed by rarefactions in which the pressure in the fluid line momentarily falls below normal. In the event of a rarefaction, the mandrel 53 may expand somewhat from the position shown in Fig. 1, and the resilient sleeve 54 is somewhat further expanded. When the pressure in the fluid line returns to normal after the rarefaction, the sleeve and mandrel may return to the positions shown in Fig. 1.

Particular attention should be paid now to Fig. 2 in which there is shown a second embodiment of the invention. Plug 62 has a bore 63 centrally disposed thereof, having a threaded portion 64 for connecting thereto a conduit carrying fluid under pressure, for example, compressed air, for introduction into the mandrel, to assist the mandrel in opposing contraction as a result of pressure increases applied thereto.

The aforementioned bore 63 has a portion 65 which tapers outwardly at the inside end thereof, into a threaded bore portion 66 in which there is mounted in threaded engagement therein a cup or cap member 67 having aperture 68 therein. Mounted in cup member 67 is a tapered tension spring 69 which normally forces a valve element or ball 70 into seated engagement with tapered portion or seat 65. The cup or cap member 67 having aperture 68 together with the spring 69 and ball 70 constitute a check valve of conventional design. As aforementioned, the threaded portion 64 of bore 63 is adapted to be connected to a source of fluid under pressure. Fluid may thus be admitted into the inside of mandrel 53 for precharging the interior of the sleeve 54, the fluid under pressure within the sleeve assisting the mandrel in opposing contraction of the sleeve as a result of increases of line fluid pressure on the outer surface of the sleeve. The aforementioned check valve prevents the escape of fluid under pressure from inside the sleeve 54 and mandrel 53 back into the pipe section 10, after the charging connection has been disconnected.

The embodiment of Fig. 2 is especially suitable for use in high pressure fluid systems.

Particular reference should be made now to Fig. 4, in which modified forms of the mandrel and closing member, suitable for use in both embodiments of the invention, are shown. The resilient mandrel, designated by the reference numeral 71, has ungrooved tapered edges 72 and 73 at the break in the cylinder wall. The closing member 74 has outer skirts 75 and 76 extending along the length thereof, and inner skirts 77 and 78 extending along the length thereof. The arrangement of Fig. 4 is especially suitable for use where the material used or range of fluid pressures makes a thin-walled mandrel desirable, since the necessity for grooves in the edges is obviated. The form of apparatus of Fig. 4 has the further advantage of reducing or eliminating the longitudinal bulge in the resilient sleeve.

Whereas the invention has been shown and described in connection with embodiments thereof in which a resilient sleeve having a certain length and diameter is shown, and a mandrel having a certain thickness is shown, it should be understood that the invention is not limited to any of the particular dimensions shown in the drawings, which are intended to be illustrative only.

Having now described the invention, what I claim as new and desire to secure by Letters Patent, is:

1. Pulsation dampening and surge absorbing apparatus for use with a conduit conveying a fluid under variable pressure, comprising, in combination, a hollow casing means connectible to the conduit; a generally tubular, longitudinally slit, metallic, radially expandable and contractible mandrel disposed within said casing means; resilient rubber sleeve means encircling said mandrel and constantly supported against inward collapse by engagement with the outer periphery of said mandrel; means for sealing said sleeve means at its respective ends; means for sealing said mandrel at its respective ends; and means for supporting said mandrel and sleeve means in generally concentric spaced relation relative to and within said casing means, said supporting means having longitudinal through apertures for permitting fluid from the conduit to flow around the outer surface of said sleeve means, such that upon a surge-induced increase in fluid pressure in the conduit to a pressure above a normal value, said mandrel will contract radially for absorbing the shock energy of such surge while also supporting said sleeve means against uncontrolled collapse, and upon a subsequent decrease in pressure in the conduit toward its normal value, said mandrel will expand radially for displacing fluid from within said hollow casing means back into the conduit.

2. The combination according to claim 1, including a resilient closure member disposed within the slit in said mandrel and having a flap-like portion which overlies the exterior of said mandrel adjacent said slit for preventing resilient material of said resilient sleeve means from being extruded into said slit.

3. Pulsation dampening and surge absorbing apparatus for use with a conduit conveying a fluid under variable pressure, comprising, in combination, hollow casing means connectible to the conduit and having a longitudinal opening of substantially circular cross-section; a generally tubular, longitudinally slit, metallic, radially expandible and contractible mandrel disposed within said longitudinal opening in the casing means; resilient rubber sleeve means encircling said mandrel and constantly supported against inward collapse by engagement with the outer periphery of said mandrel; means for sealing said sleeve means at its respective ends; means for sealing said mandrel at its respective ends; and means for supporting said mandrel and sleeve means in generally concentric spaced relation relative to and within said opening, said supporting means having longitudinal through apertures for permitting fluid from the conduit to flow around the outer surface of said sleeve means; said sleeve means being in a radially stretched state when pressure of fluid in the conduit is at and below a normal value in consequence of the radial expansive force exerted on said sleeve means by said mandrel, such that upon a surge-induced increase in pressure of fluid in the conduit to above said normal value said mandrel and sleeve means will contract radially and permit said sleeve means to collapse to its free unstretched cylindrical state without creation of folds in said sleeve means.

References Cited in the file of this patent

UNITED STATES PATENTS

| | | |
|---|---|---|
| 2,342,355 | Mercier | Feb. 22, 1944 |
| 2,583,231 | Ragland | Jan. 22, 1952 |
| 2,650,086 | Sjolander | Aug. 25, 1953 |
| 2,760,518 | Peet | Aug. 28, 1956 |

FOREIGN PATENTS

| | | |
|---|---|---|
| 486,855 | Great Britain | June 7, 1938 |
| 509,387 | Canada | Jan. 25, 1955 |
| 730,582 | Great Britain | May 25, 1955 |